March 18, 1969

W. L. GAGNON ET AL 3,433,977

PULSE LINE HAVING COMPONENTS COAXIALLY
INTERCONNECTED AND CONFINED WITH
LARGE SURFACE AREA CONDUCTORS

Filed Aug. 5, 1966

Sheet _1_ of 2

INVENTORS
WILLIAM L. GAGNON
DOMINIC T. SCALISE
BOB H. SMITH

Roland G. Anderson
ATTORNEY

INVENTORS
WILLIAM L. GAGNON
DOMINIC T. SCALISE
BOB H. SMITH

ATTORNEY

United States Patent Office 3,433,977
Patented Mar. 18, 1969

3,433,977
PULSE LINE HAVING COMPONENTS COAXIALLY
INTERCONNECTED AND CONFINED WITH
LARGE SURFACE AREA CONDUCTORS
William L. Gagnon, El Sobrante, Dominic Theodore
Scalise, and Bob H. Smith, Berkeley, Calif., assignors
to the United States of America as represented by the
United States Atomic Energy Commission
Filed Aug. 5, 1966, Ser. No. 571,156
U.S. Cl. 307—106
Int. Cl. H03k 3/00
4 Claims

ABSTRACT OF THE DISCLOSURE

A fast-pulse-forming line constructed of a group of coils serially and coaxially aligned within an electrically conductive inner cylinder with a large number of capacitors mounted on annular discs in pairs of layers around the coils. The capacitors in each pair of layers have one set of terminals connected together to a disc that connects to the juncture of adjacent coils while the other capacitor terminals are connected together to a disc connected to the cylinder. An outer cylinder coaxially encloses the inner cylinder with resistors mounted and connected between the cylinders.

The invention disclosed herein was made under, or in, the course of Contract No. W-7405-eng-48 with the United States Atomic Energy Commission. This invention relates generally to electronic circuitry and more particularly to a novel configuration for a high current pulse line for producing a very rapid current pulse.

While having various potential uses, the present invention was particularly developed for use with a high energy particle accelerator of the synchroton type. To extract the high energy charged particle beam from such an accelerator, it is necessary to suddenly direct the particle beam from the orbital path around the synchroton which the beam follows while being accelerated. A very rapidly pulsed magnetic field from a beam extracting magnet is used to divert the beam, it being necessary to provide a very rapid pulse of high current to the magnet to obtain the necessary field. A pulse line is utilized to provide such a current pulse, but owing to the high currents involved and the fast rise time of the current pulses, a pulse line of conventional construction produces a stray or leakage field of high magnitude in the region around the line. Since it is frequently convenient or necessary to dispose electronic apparatus in the vicinity of the pulse line, such stray field can cause serious interference with the electronic signals in the electronic apparatus and may even damage the apparatus.

Therefore, the present invention was developed to provide a pulse line in which very little external field is created. The pulse line has a coaxial design in which inductance coils are disposed along the axis of a conductive cylinder, capacitors being disposed coaxially around the coils and being connected between the cylinder and the coils. Magnetic fields produced by current through the coils are cancelled by the magnetic fields produced by the return current through the cylinder so that no external magnetic fields are produced.

It is an object of the present invention to provide a novel construction for a pulse line to obtain minimal external magnetic field.

It is another object of the present invention to provide an improved pulse line in which the impedance of an associated transmission line for output current pulses can be conveniently matched with that of the pulse line.

It is another object of the present invention to provide an improved pulse line which may be disposed adjacent to sensitive electronic apparatus without interfering therewith.

It is another object of the invention to provide a pulse line which is compact and convenient to construct.

Figure 3:
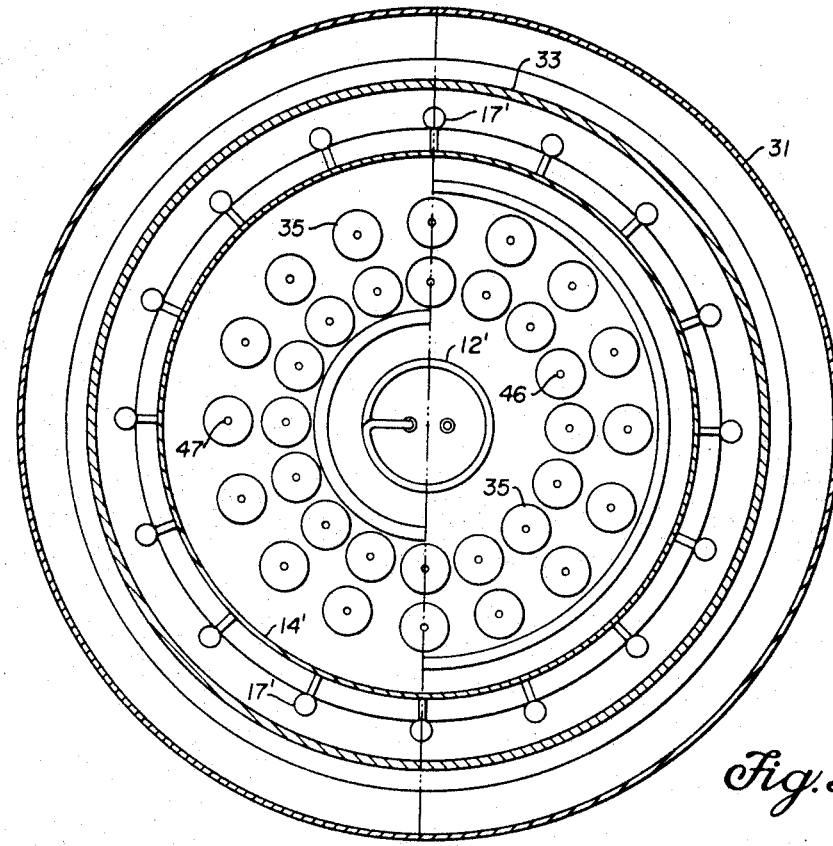
Figure 1:
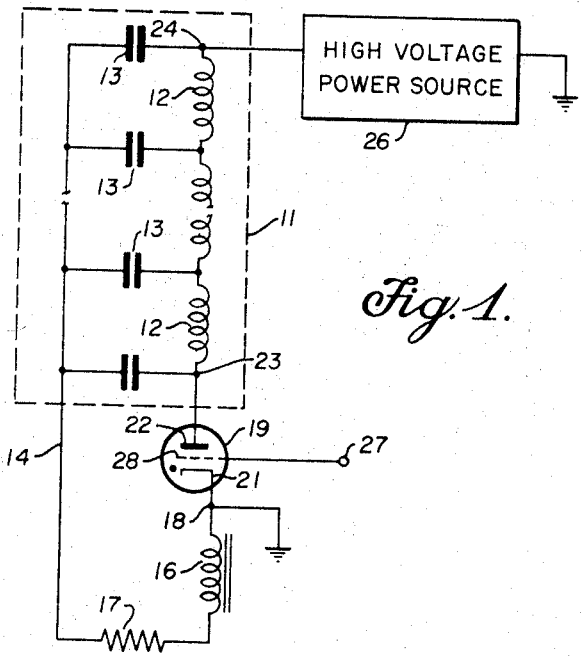
Figure 2:
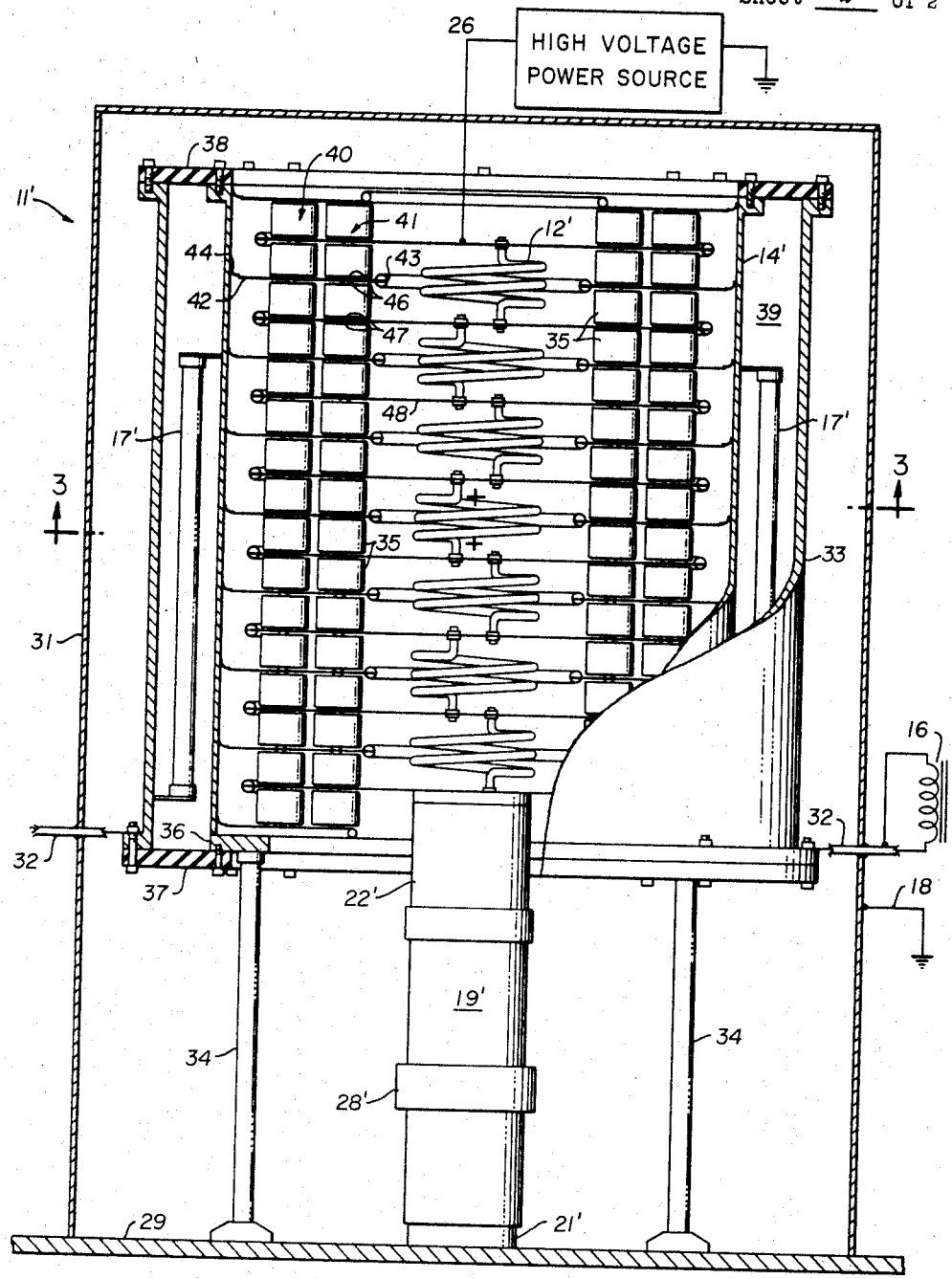

The invention will be best understood by reference to the accompanying drawing of which:

FIGURE 1 is a schematic circuit drawing showing a pulse line as typically used in conjunction with a beam extractor for a particle accelerator, FIGURE 2 is a broken-out section view of the pulse line shown schematically in FIGURE 1, and FIGURE 3 is a section view of the pulse line taken at line 3—3 in FIGURE 2.

Referring now to FIGURE 1, there is shown a pulse line 11 in which a plurality of inductance coils 12 are connected in series. A plurality of capacitors 13 are connected from the ends of each coil to a shield conductor 14. The capacitance value of the capacitors 13 and the inductance of the coils 12 are selected according to the equation:

$$Z_o = \sqrt{L/C}$$

where:

$Z_o$=characteristic impedance of the pulse line 11
$L$=inductance of each coil 12
$C$=capacitance of each capacitor 13.

A beam extracting magnet for deflecting high energy charged particles has a coil 16 connected through an impedance matching resistor 17 to the shield conductor 14. The combined impedance of the magnet coil 16 and the resistor 17 preferably match the characteristic impedance of pulse line 11. The other end of the magnet coil 16 is connected to a ground terminal 18. A hydrogen filled thyratron switching tube 19 has a cathode 21 connected to the ground terminal 18 and has an anode 22 connected to one end 23 of the series-connected coils 12. The opposite end of the series connected coils is connected to a high voltage terminal 24. A typical potential of positive 40,000 volts is applied at terminal 24 from an external power source 26. Conduction through thyratron tube 19 is initiated by a trigger signal applied at an input terminal 27 connected to a thyratron control electrode 28.

In the operation of the above circuit, the capacitors 13 are all charged to the potential applied at the high voltage terminal 24. When a trigger signal is applied at input terminal 27, the thyratron tube 19 is caused to conduct, coupling end 23 of the coils 12 to ground 18. The pulse line is thereby discharged in a fast pulse through the magnet 16. The internal impedance of power supply 26 is generally so high, relative to the pulse line impedance, that it is not necessary to disconnect the supply during the discharge operation, the supply impedance effectively decoupling the supply 26 from the pulse line during discharge of the line.

The novelty of the present invention lies in the unique physical configuration of the pulse line circuitry shown in FIGURE 1 and in the novel configuration of the pulse line with respect to the other circuit components.

Referring now to FIGURE 2, there is shown an outer cylindrical ground shield 31 which is electrically connected to the ground terminal 18. The shield 31 is an enclosure with a lower end affixed to and supported on a base 29. A plurality of coaxial cables 32 are connected in parallel across the magnet 16, the outer shields of the cables being connected to the outer shield 31 and the inner conductors being connected to intermediate cylindrical conductor 33, which is disposed coaxially within outer shield 31. An inner cylindrical conductor 14' is disposed coaxially within intermediate conductor 33 and is electrically coupled thereto through a plurality of paralleled resistors 17' which provide a combined resistance equal to that of resistance 17 of FIGURE 1.

Physical support for the various elements of the apparatus and electrical isolation is provided by a plurality of insulative pedestals 34 resting on and affixed to the base 29. A conductive support ring 36 rests on the pedestals 34 and is electrically connected to and supports inner conductor 14'. A first insulator ring 37 is affixed to the outer edge of support ring 36 and provides physical support for the base of intermediate conductor 33. A second insulator ring 38 is disposed at the opposite end of intermediate conductor 33 and inner conductor 14' and is affixed thereto. Thus, a closed annular region 39 is formed between conductors 33 and 14' and between insulator rings 37 and 38. Low conductivity cooling water may be circulated through such region 39 by means not shown to remove heat generated by resistors 17'.

A plurality of capacitors 35 are disposed in two concentric multi-layered rings 40 and 41 coaxially within the inner conductor 14', two layers of the rings 40 and 41 being paralleled to form a single capacitor 13. Each capacitor 35 has electrical terminals 46 and 47 located at opposite ends thereof. The centerline of each individual capacitor 35, which passes through the terminals 46 and 47 thereof, is parallel with the central axis of the pulse line 11'.

Each capacitor 13 as indicated in FIGURE 1 is made up from many capacitors 35 connected in parallel. Thus, the inner conductor 14' is electrically connected to one terminal 46 of each of the capacitors 35. Such connections are provided by a plurality of annular conductive discs 42, each disc having a central aperture 43 and having outwardly pressing flexible contact fingers 44. Each disc 42 has an outer diameter slightly less than the inner diameter of the inner conductor 14' so that the disc 42 may be inserted coaxially therein, while the fingers 44 make electrical contact with the inside wall of inner conductor 14'. A single disc 42 makes electrical contact with the facing terminal 46 of every adjacent capacitor 35, thereby electrically connecting such terminals to inner conductor 14'. Likewise, electrical contact is made from the inner conductor 14' to every other terminal 46 by other discs 42 provided at intervals of every second layer of capacitors 35.

A plurality of second electrical contact discs 48 are disposed midway between each pair of discs 42, each such disc 48 making electrical contact with the capacitor terminals 47. The second discs 48 extend perpendicularly across the axis of the pulse line 11'. Coils 12' are disposed along the axis of the pulse line 11' through the aperture 43 of the discs 42 and each coil is connected between adjacent pairs of the second discs 48. At the bottom of the pulse line, the hydrogen thyratron tube 19' is disposed on the axis of the pulse line 11' with the anode 22' electrically connected to the lowest of the second discs 48.

All of the various components are provided with conventional corona shielding where necessary to avoid arcing from high intensity electrical fields. Cooling water may be circulated around the inner conductor 14' and to the anode 22', control electrode 28' and cathode 21' of thyratron 19', if necessary.

Considering the operation of the pulse line 11', it can be seen from the general coaxial configuration of the line that a magnetic field produced by the coils 12' is cancelled in the region outside the inner conductor 14' by an oppositely directed magnetic field from the return current in the inner conductor 14'. The pulse line is carefully designed to provide symmetrical current distribution through the inner conductor 14' so that the external magnetic field cancellation will be complete.

The novel construction of the pulse line is further advantageous in that the impedance of transmission lines 32 from the pulse line 11 to the load 16 may be conveniently matched to the pulse line impedance by connecting many transmission lines in parallel. The total number of parallel-connected transmission lines may be conveniently adjusted to accurately match a particular pulse line impedance. For instance, in a particular embodiment of the invention as shown in FIGURES 2 and 3, the pulse line impedance was two ohms. Since 50 ohm coaxial cable was readily available, 25 transmission lines having 50 ohm impedance were utilized to obtain the desired two ohm resultant impedance. Owing to the circular construction of the present invention, there is convenient space available to connect as many transmission lines thereto in parallel as is necessary to obtain the desired final impedance.

As a variation from the construction shown in FIGURE 2, the capacitors 35 in any particular layer of rings 40 and 41 may be angularly displaced with respect to capacitors 35 in the adjacent higher or lower layer. Such displacement may be beneficial for minimizing physical stress on the capacitors when the pulse line is operated. As a further variation, it would be possible to construct large annular capacitors to replace the multi-unit capacitors 13' shown in FIGURES 2 and 3. Such an annular capacitor would be disposed coaxially around the coils 12' and would preferably have annular terminals to provide even current distribution.

As a further variation, a standard Gibbs suppressor resistor may be provided to avoid possible ringing in the output pulse waveform. Such resistor would be connected in series with the capacitor 13 nearest the anode 22.

While the invention has been disclosed with respect to a particular embodiment, it will be apparent to those skilled in the art that numerous variations and modifications may be made within the spirit and scope of the invention and it is not intended to limit the invention except as defined in the following claims.

What is claimed is:
1. In a coaxial pulse line having a selected characteristic impedance and a minimum of stray inductance for providing a fast pulse to a load while creating minimal external magnetic field comprising, a plurality of inductance coils connected in series, each of said coils being disposed on a common axis, a first conductive cylinder disposed coaxially around said coils, a plurality of capacitances connected from the ends of said coils to said cylinder, each of said capacitances being constituted of a plurality of relatively small capacitor units having first and second terminals and disposed symmetrically in a ring coaxially around said coils and within said cylinder, a plurality of first annular conductive discs electrically connected one each to the juncture between the ends of said coils and perpendicularly disposed with respect to the axis of said coils, said capacitances being stacked in layers in pairs, each pair of capacitances being disposed for connection of the first terminals of the constituent capacitor units thereof to one of said plurality of first discs, a plurality of second annular conductive discs each disposed between adjacent pairs of capacitances for connection to the second terminals of the constituent capacitor units thereof, means connected to the periphery of each of said second discs for electrically contacting said cylinder along substantially the entire area of the inner wall that is adjacent thereto, the value of said capacitances and the inductance of said coils being selected according to the equation: characteristic impedance equals

$$\sqrt{\text{inductance/capacitance}}$$

means for applying a charging pulse across each of said capacitances, and switch means connected in series with one end of said series connected coils for discharging said capacitances to said load to provide said fast pulse.

2. A pulse line as described in claim 1 wherein said switch means is a thyratron type tube disposed coaxially at one end of said series-connected coils and connected to one end thereof.

3. A pulse line as described in claim 1 further characterized in that a plurality of parallel-connected resistive elements are disposed outside and spaced around said cylinder each having one end connected to said cylinder and the other end connected in series with said switch means and said load, the series impedance of said load and said resistors being matched to said characteristic impedance.

4. A pulse line as described in claim 3 further characterized in that a second conductive cylinder is disposed coaxially with said first cylinder for confining said resistive elements therebetween in a small volume to minimize the stray inductance of said pulse line.

References Cited

UNITED STATES PATENTS

| | | | |
|---|---|---|---|
| 2,527,608 | 10/1950 | Willoughby. | |
| 3,014,170 | 12/1961 | Nygard | 307—110 X |
| 3,063,000 | 11/1962 | Cleland | 307—110 X |
| 3,248,574 | 4/1966 | Dyke et al. | 307—110 |
| 3,256,439 | 6/1966 | Dyke et al. | 307—110 X |
| 3,366,799 | 1/1968 | Fitch | 307—110 |

ROBERT K. SCHAEFER, *Primary Examiner.*

D. SMITH, JR., *Assistant Examiner.*

U.S. Cl. X.R.

307—110